(12) United States Patent
Straßer

(10) Patent No.: US 12,365,253 B2
(45) Date of Patent: Jul. 22, 2025

(54) METHOD FOR OPERATING A MOTOR VEHICLE, AND THE MOTOR VEHICLE

(71) Applicant: AUDI AG, Ingolstadt (DE)

(72) Inventor: Roman Straßer, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 147 days.

(21) Appl. No.: 17/956,556

(22) Filed: Sep. 29, 2022

(65) Prior Publication Data

US 2023/0098232 A1 Mar. 30, 2023

(30) Foreign Application Priority Data

Sep. 30, 2021 (DE) .......................... 102021125349.7

(51) Int. Cl.
*B60L 50/51* (2019.01)
*H02J 3/18* (2006.01)

(52) U.S. Cl.
CPC ................ *B60L 50/51* (2019.02); *H02J 3/18* (2013.01); *B60L 2210/40* (2013.01); *B60L 2220/10* (2013.01); *B60L 2240/40* (2013.01)

(58) Field of Classification Search
CPC .. B60L 50/51; B60L 2210/40; B60L 2220/10; B60L 2240/40; H02J 3/18
USPC ....................................................... 318/260
See application file for complete search history.

(56) References Cited

U.S. PATENT DOCUMENTS

| | | | |
|---|---|---|---|
| 7,653,466 B2* | 1/2010 | Egami ..................... | B60L 15/20 318/432 |
| 11,300,632 B2* | 4/2022 | Maurin, Jr. ............ | G01R 31/42 |
| 2007/0145926 A1* | 6/2007 | Egami ................... | B60W 20/10 318/432 |
| 2017/0120762 A1* | 5/2017 | Zettel ........................ | B60L 7/14 |
| 2017/0274888 A1* | 9/2017 | Suzuki ................... | B60K 6/445 |

FOREIGN PATENT DOCUMENTS

| | | |
|---|---|---|
| CN | 107465230 A | 12/2017 |
| CN | 110957749 A | 4/2020 |
| DE | 102012018495 B3 | 12/2013 |
| KR | 20150062689 A | 6/2015 |

OTHER PUBLICATIONS

Du et al. (CN 108347211 A).A Motor Reactive Power Compensation System And Method Date Published Jul. 31, 2018 (Year: 2018).*

* cited by examiner

Primary Examiner — Jorge L Carrasquillo
(74) Attorney, Agent, or Firm — Seed IP Law Group LLP

(57) ABSTRACT

A method for operating a motor vehicle comprising at least one first electric machine and at least one second electric machine, which are electrically interconnected to each other, wherein the first electric machine is operated at a first operating point and the second electric machine is operated at a second operating point, wherein the reactive power generated or taken up by the first electric machine at the first operating point is at least partly compensated by the second electric machine operating at the second operating point.

12 Claims, 1 Drawing Sheet

METHOD FOR OPERATING A MOTOR VEHICLE, AND THE MOTOR VEHICLE

BACKGROUND

Technical Field

Embodiments of the invention relate to a method for operating a motor vehicle comprising at least one first electric machine and at least one second electric machine, which are electrically interconnected to each other. Furthermore, embodiments of the invention relate to a motor vehicle.

Description of the Related Art

Electric machines in motor vehicles are generally operated directly or controlled across an inverter, such as a pulse inverter. Thanks to the inverter, a direct current which is taken from an energy accumulator, such as a traction battery, can be converted into an alternating current to operate the electric machine. Thus, a direct current sub-grid and an alternating current sub-grid of the motor vehicle are connected across the inverter, wherein the energy accumulator is situated in the direct current sub-grid and the electric machine in the alternating voltage sub-grid.

Electric machines basically constitute inductive loads, so that an unwanted displacement reactive power may be produced. Thanks to the reactive power given off or taken up, a reactive current occurs, which may be a load in addition to an active current on the direct current sub-grid, the inverter and the alternating current sub-grid. The drawback here is that the reactive current and the associated reactive power cannot be changed by the electric machines into another form of energy, especially mechanical energy.

Furthermore, the components of the electric system must be designed for the additional reactive power, since this likewise flows through the components and thus must be taken into account, in addition to the active power, when designing the maximum performance capability of the components. Therefore, approaches are known in the prior art for the compensation of reactive power, by which at least the loading of a portion of the components of an electric system with the reactive power can be avoided or at least reduced.

In DE 10 2012 018 495 B3 a microdynamic reactive power compensation is described for optimally compensating a consumer having a complex alternating electrical load, such as an electric machine, with no time delay whenever possible. This makes use of a network of variously switched capacitors, which is connected to the phase lines of an electric machine. By switching in or switching out of capacitors, the reactive power of the electric machine can be dynamically compensated in dependence on the operating state of the electric machine.

CN 110 957 749 A describes a bidirectional inverter device, comprising a device for reactive power compensation. The inverter device can be used for charging of electric motor vehicles. The inverter device can decide whether a reactive power compensation is required, and this can optionally be implemented by unused modules of the inverter device.

From CN 107 465 230 A there is known a direct current charging station for an electric motor vehicle. The charging station comprises a phase-shifting transformer, which eliminates the harmonics which occur by a shifting of the phase on the high-voltage side of the transformer.

KR 2015 0062 689 A discloses a device for the management of a bidirectional power transmission. The device serves for converting an alternating current into a direct current in order to feed this into a battery. A control unit of the device performs a compensation of reactive power and a filtering of harmonics on the input side of the circuit based on currents and voltages determined by a measurement device.

BRIEF SUMMARY

Some embodiments provide an improved method for reactive power compensation, which is particularly suitable within a motor vehicle.

In some embodiments, in a method of the kind mentioned above, the first electric machine is operated at a first operating point and the second electric machine is operated at a second operating point, wherein the reactive power generated or taken up by the first electric machine at the first operating point is at least partly compensated by the second electric machine operating at the second operating point.

At the first operating point where the first electric machine is operating, depending on the operating mode the machine can generate or take up electric reactive power. At the same time, the second electric machine is operated at the second operating point, and this machine accordingly takes up the reactive power generated by the first electric machine or generates the reactive power taken up by the first electric machine. In this way, the reactive power building up in the onboard network of the motor vehicle can be shuttled between the first electric machine and the second electric machine. It may be advantageous to relieve the load on other components of the onboard network in this way. In particular, it is possible to achieve in at least one alternating current sub-grid of the motor vehicle a power factor of $\cos(q)=0.8$ or better, such as 0.9 or better, or 1 or at least almost 1.

The use of the at least one second electric machine for the compensation of the reactive power generated or taken up by the first electric machine, or the inductive or capacitive reactive power transformed by the first electric machine, makes it possible to use hardware for the reactive power compensation which is already available in the motor vehicle. This simplifies the method, since no special compensation circuits are needed for the compensation of the reactive power, so that a space-saving integration of the reactive power compensation in a motor vehicle is possible.

Thus, no additional circuits are needed for the reactive power compensation, which has an advantageous impact on the weight and costs of the motor vehicle. Furthermore, the reliability of the motor vehicle can be improved, since fewer components are subject to wear and tear or need to undergo regular inspection or servicing.

It can be provided that each time an electric traction motor of the motor vehicle is used as the first electric machine and as the second electric machine, the electric traction motors being in particular associated each with a different axle of the motor vehicle. For example, the first electric machine may be the main electric traction motor of the motor vehicle, by which the motor vehicle is driven in driving operation. The second electric machine may be, for example, a boost motor, by which a supplemental driving of the motor vehicle occurs only in special operating states, such as when high motor power is required. A reactive power compensation of the reactive power generated or taken up by the first electric machine can be done in particular in cases where the maximum power is not demanded and the propulsion of the motor vehicle occurs solely through the first electric machine.

The first electric machine may for example be associated with a rear axle of the motor vehicle and the second electric machine may be associated with a front axle, or vice versa. It is also possible for the motor vehicle to have more than one electric machine and/or more than one second electric machine, for example, a first electric machine can be associated respectively with one wheel on a rear axle of the motor vehicle and a second electric machine can be associated respectively with one wheel on a front axle, or vice versa.

It can be provided that the second operating point is set depending on the first operating point, especially depending on the reactive power generated or taken up at the first operating point, and/or depending on driving state information describing a driving state of the motor vehicle. The first operating state may be a motor operation or a generator operation, for example for the recuperation of mechanical energy.

For example, the first operating point of the first electric machine may depend on the current driving state or a driving state to be organized for the current driving operation, while the second operating point of the second electric machine can be chosen in dependence on the first operating point. The second operating state can also be organized in dependence on driving state information describing a driving state of the motor vehicle, and in particular there can occur a reactive power compensation operation of the second electric machine when the motor vehicle does not require the second electric machine in the current driving state for the propulsion of the motor vehicle and/or for another function.

In one embodiment, it can be provided that the second operating point is set depending on a measured value describing a reactive current and/or a reactive power of the first electric machine at the first operating point and/or that the second operating point is set depending on a memorized assignment rule.

It is possible, for example, for the first electric machine to be associated with at least one current sensor, by which the phase currents which energize the electric machine or which are generated by it are measured. With the aid of the current sensor and/or at least one voltage sensor, which measures the phase voltages, a reactive current can be determined, for example taking into consideration the first operating point being established, so that the magnitude of a reactive power and/or the phase position of a reactive power can be ascertained. Accordingly, it can also be determined whether it is a capacitive or an inductive reactive power.

In addition or alternatively, the second operating point can be set in dependence on a memorized assignment rule, which indicates for example the second operating point to be established for different possible first operating points. The assignment rule can be stored for example in a control device, and the control device can also in particular carry out the control of the electric machines or power electronic circuits connected to the electric machines for their operation.

It can be provided that the first electric machine is operated in a motor mode or a generator mode at the first operating point and/or the second electric machine is operated in a phase shifter mode at the second operating point. Thus, the second electric machine can be operated only for compensation of the reactive power generated or taken up by the first electric machine. The driving operation or a recuperation operation accordingly can occur in parallel solely through the first electric machine.

In one embodiment, it can be provided that the second electric machine at the second operating point is mechanically decoupled via at least one coupling device from a component of a drive train of the motor vehicle, especially a transmission or an axle of the motor vehicle. In this way, it can be achieved that no influencing of the driving operation of the motor vehicle occurs from the second operating point established for the second electric machine, so that the exclusive operation of the second electric machine occurs for the reactive power compensation, such as a phase shifter mode.

For the operation of the first electric machine and the second electric machine it can be provided that these are each connected or can be connected across at least one inverter to a direct current sub-grid of the motor vehicle, wherein the first electric machine at the first operating point and the second electric machine at the second operating point are each operated via a different one of the inverters.

Consequently, there can be provided a first inverter and a second inverter, the first inverter operating the first electric machine and the second inverter the second electric machine. It is possible for the first inverter and the second inverter to each be controlled via a common control device, which for example can set the first operating point and the second operating point of the electric machines by a corresponding triggering of the inverters.

In this case, the reactive power compensation by the second electric machine makes it possible for the reactive power to flow or be shuttled between the first electric machine and the second electric machine. The reactive power also flows through the first inverter and the second inverter, but no further components of a direct current sub-grid, especially a traction battery and/or an intermediate circuit capacitor, are burdened by this reactive power. Thus, neither is another form of energy source in the direct current sub-grid, such as a fuel cell or the like, burdened by the reactive power. Therefore, there is no need to feed reactive power into the energy accumulation device or into an energy generating device in the direct current sub-grid or to remove reactive power from these.

It can be provided that an alternating current side of the first electric machine and an alternating current side of the second electric machine are connected or can be connected via a switching device, wherein the alternating current side of the second electric machine at the second operating point is connected via the switching device to the alternating current side of the first electric machine.

A first electric machine, which is operated for example via a first inverter, and a second electric machine, which is operated for example via a second inverter, are each situated in different alternating voltage sub-grids of the motor vehicle onboard network, so that a direct compensation of the reactive power within an alternating current sub-grid is not possible. Thanks to providing the electric switching device, it is possible to connect the alternating current sub-grids respectively operating the first electric machine or the second electric machine. This, in particular, makes it possible to carry out a compensation of the reactive power generated or taken up by the first electric machine in a motor operation or a generator operation, respectively, by the second electric machine, for example in a phase shifter mode.

The providing of the switching device has the advantage that in this case the inverters which operate the first electric machine and the second electric machine are also not burdened by the reactive power. In this way, it is possible to adapt the maximum power, for which the inverters need to be designed, to the particular required active power, so that in particular an operation of the first electric machine can occur with a perfect loading of the first inverter with active power. In this way, the weight of the first inverter can be reduced, along with the additional expenses, such as those for additional wafer area for the switching elements of the inverter, since no reactive power shuttled through the first inverter needs to be considered in the design of the first inverter.

It can be provided that the first electric machine and/or the second electric machine is an asynchronous motor or a synchronous motor, especially a permanently excited synchronous motor or an externally excited synchronous motor. A setting of the first operating point or the second operating point can be accomplished by energizing the stator of the electric machines or optionally an externally excited rotor of the respective electric machine. In this way, different first operating points can be set for a motor or a generator operation of the first electric machine and different second operating points for a phase shifter mode or a reactive power compensation mode of the second electric machine.

For example, a control device can each time trigger an inverter connected to the respective stators of the first electric machine and the second electric machine. Analogously, at least one circuit connected to an externally excited rotor winding can be triggered by the control device to adapt the rotor excitation, for example, in dependence on the operating point being established.

For a motor vehicle, it is provided that it comprises a first electric machine and a second electric machine, which are electrically interconnected to each other, wherein the motor vehicle comprises a control device adapted to carry out a method as described herein.

The control device can be connected in particular to a first inverter, connected to the first electric machine, and to a second inverter, connected to the second electric machine, in order to perform the corresponding setting of the first operating point of the first electric machine and the second operating point of the second electric machine.

All of the advantages and embodiments described above in regard to methods apply accordingly to motor vehicles, and vice versa.

DETAILED DESCRIPTION

Figure 1:
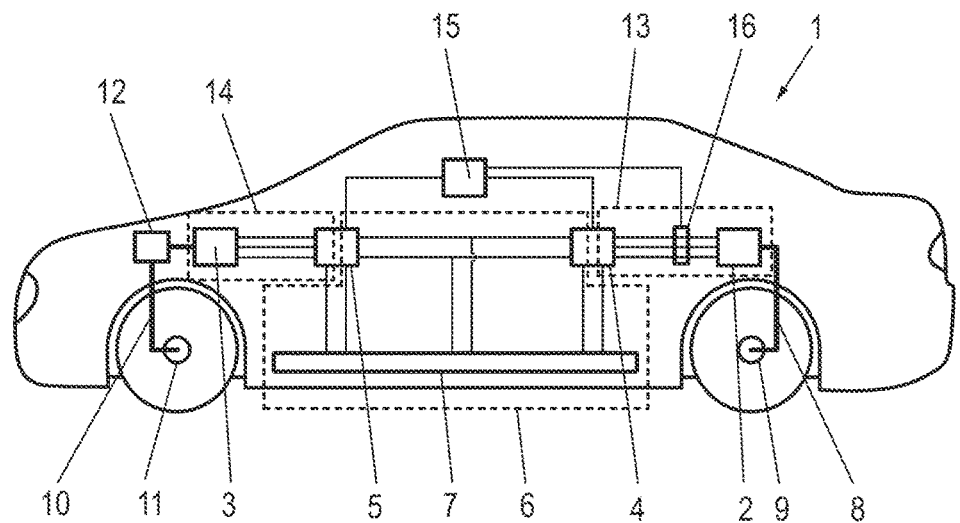
FIG. 1 shows a first embodiment of a motor vehicle.

FIG. 1 shows a first embodiment of a motor vehicle 1. The motor vehicle 1 comprises a first electric machine 2 and a second electric machine 3, which are electrically connected to each other. The first electric machine 2 and the second electric machine 3 each constitute an electric traction motor of the motor vehicle 1.

The first electric machine 2 is connected to a first inverter 4 and the second electric machine 3 is connected to a second inverter 5. The direct current sides of the inverters 4, 5 are each connected to a direct current sub-grid 6 of the motor vehicle 1, comprising a traction energy accumulator 7 of the motor vehicle 1. The direct current sub-grid 6 can include, besides the traction energy accumulator 7, also other components not shown, such as buffer capacitors and/or filter capacitors, further inverters, DC voltage converters, or the like.

The first electric machine 2 is connected by a mechanical connection 8 to a rear axle 9 of the motor vehicle 1. Accordingly, the second electric machine 3 is connected by a mechanical connection 10 to a front axle 11 of the motor vehicle 1. The mechanical connection 10 comprises a coupling device 12, by which the second electric machine 3 can be decoupled from the front axle 11. For sake of clarity, the mechanical connections are represented with a greater line thickness as compared to the electric connections.

The first electric machine 2 is operated via the first inverter 4, the alternating current side of the inverter 4 and the electric machine 2 being interconnected within a first alternating current sub-grid 13 of the motor vehicle 1. Accordingly, the second electric machine 3 can be operated via the second inverter 5 and is connected to it in a second alternating current sub-grid 14 of the motor vehicle 1.

The motor vehicle 1 furthermore comprises a control device 15, which is connected to the first inverter 4 and the second inverter 5. By means of the control device 15, the inverters 4, 5 can be triggered, so that the operation of the electric machines 2, 3 can be controlled via the control device 15.

In one embodiment of a method for operating the motor vehicle 1, the first electric machine 2 is operated at a first operating point. The second machine 3 is operated at a second operating point, the reactive power generated or taken up by the first electric machine 2 at the first operating point being at least partly compensated by the second electric machine 3 operating at the second operating point.

The first electric machine 2 can be operated at the first operating point in a motor operation or a generator operation. The electric machine 2 can generate or take up reactive power, the second electric machine 5 being driven at the second operating point so that it fully or partly compensates the reactive power generated or taken up by the first electric machine.

The control device 15 can set the first operating point of the first electric machine 2 for example in dependence on a driving state being established for the motor vehicle 1. In dependence on the driving state or the established first operating point, the control device 15 can accordingly set the second electric machine 3 at the second operating point.

In addition or alternatively, the control device 15 can also set the second operating point in dependence on a reactive power generated or taken up by the first electric machine 4. For this, the second operating point can be set for example in dependence on a measurement value describing a reactive current and/or a reactive power of the first electric machine 2 at the first operating point. For this, the motor vehicle 1 has for example a measurement device 16, which is connected to the control device 15. Through the measurement device 16, the control device 15 obtains at least one measured value describing a reactive current or a reactive power of the first electric machine 2 at the first operating point, and in dependence on this the control device 15 can set the second operating point of the second electric machine 3.

In addition or alternatively, the second operating point can also be set in dependence on a memorized assignment rule, the assignment rule being memorized for example in a storage device of the control device 15 and matching up the different first operating points which can be set for the first electric machine 2 with a second operating point of the second electric machine 3.

Thanks to the reactive power compensation by the second electric machine 3, the reactive power is shuttled between the first electric machine 2 and the second electric machine 3 and thus does not burden the traction energy accumulator 7 of the motor vehicle 1. Neither are other components of the direct current sub-grid 6 burdened by the reactive power, such as intermediate circuit capacitors or the like. In this way, a heating of these components during the operation of the motor vehicle 1 can be reduced, which has a favorable effect on their performance and can also reduce long-term wear on these components.

In order to prevent an influencing of the driving operation of the motor vehicle 1 by the second electric machine 3 operating at the second operating point, this can be mechanically decoupled at the second operating point from the front axle 11 of the motor vehicle 1 by the coupling device 12. Besides a decoupling of the second electric machine 3 from an axle 11, a decoupling of another component of the drive train of the motor vehicle 1 can also be done, such as a decoupling from a transmission.

Figure 2:
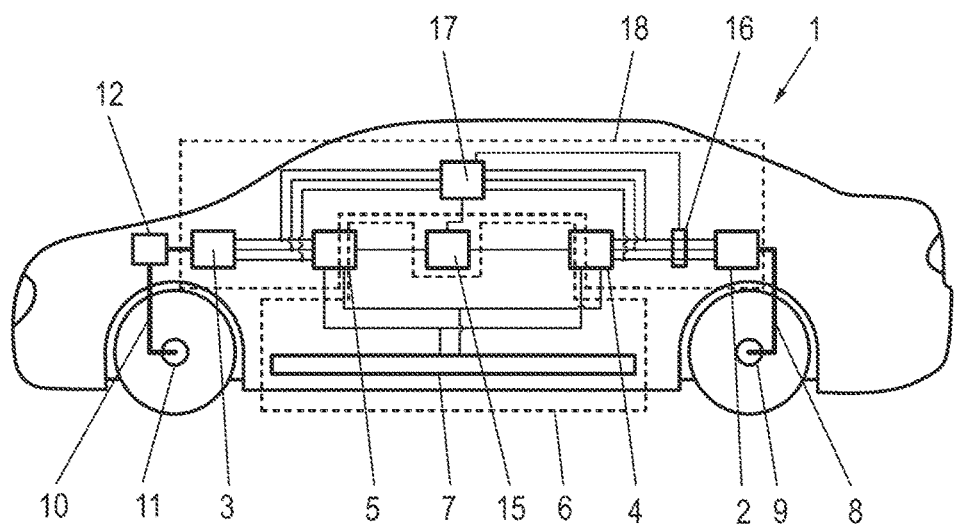
FIG. 2 shows a second embodiment of a motor vehicle.

FIG. 2 shows a second embodiment of a motor vehicle 1. The layout of the motor vehicle 1 basically corresponds to the layout of the first embodiment of FIG. 1, so that the same reference numbers are used for the same components.

In addition, the motor vehicle 1 in the second embodiment comprises a switching device 17, which is connected to the alternating current side of the first electric machine 2 and the alternating current side of the second electric machine 3 or to the first alternating current sub-grid 13 and the second alternating current sub-grid 14. The switching device 17 comprises, for example, at least three switching elements (not shown), by which the phases of the first alternating current sub-grid 13 can be connected each time to another one of the phases of the alternating current sub-grid 14.

The switching device 17 makes it possible to interconnect the first alternating current sub-grid 13 with the second alternating current sub-grid 14, so that a direct compensation of the reactive power generated or taken up by the first electric machine 3 can occur in an interconnected alternating current onboard network 18. For example, the electric machine 2 can be operated in a motor operation or a generator operation as the first operating point and the second electric machine 3 can be operated in a phase shifter mode, in order to perform a reactive power compensation of the reactive power generated or taken up by the first electric machine 2. The switching device 17 can be driven for example by the control device 15, in particular at the same time as the setting of the second operating point of the second electric machine 3. In the interconnected state of the alternating current grids 13, 14, the second inverter 5 can be disconnected, for example, so that it provides no connection of the alternating current grids 13, 14 to the direct current sub-grid 6.

Thanks to the connection of the alternating current sub-grids 13, 14 via the switching device 17, the reactive power is shuttled between the first electric machine 2 and the second electric machine 3 only through the switching device 17 and thus the first inverter 4 and the second inverter 5 are no longer burdened by it. This makes it possible to operate the first electric machine 2 via the first inverter 4 with a better power factor, in particular, with a power factor of $\cos(\varphi)=0.95$ or higher, in particular 0.98 or higher. The available performance capability of the inverter 4, especially that of the semiconductor components provided in the inverter 4, can be fully utilized for a transfer of active power, so that in particular a higher possible performance capability of the first electric machine 2 and/or a small design of the first inverter 4 may result.

In both embodiments, the first electric machine 2 and the second electric machine 3 may be configured, for example, as an asynchronous motor or as a synchronous motor, especially as a permanently excited synchronous motor or as an externally excited synchronous motor. The first operating point of the first electric machine 2 and the second operating point of the second electric machine 3 can be set in this case by energizing the stator of the respective electric machine 2, 3. In the case of an externally excited electric machine, the particular operating point can also be set by energizing the rotor of the respective electric machine 2, 3 with the aid of a circuit (not shown in the figures) for energization of the rotor, the circuit being driven for example by the control device 15.

In both embodiments it is possible for the motor vehicle 1 to have more than one first electric machine 2 and/or more than one second electric machine 3. This may be the case, for example, when there is provided in the motor vehicle 1 a separate electric motor each time for the individual wheels on one axle or on both axles for the propulsion of the motor vehicle. In this case, the first electric machines 2 can be the electric machines associated with the wheels of the rear axle 9 and/or the second electric machines 3 can be the electric machines associated with the wheels of the front axle 11 or vice versa.

German patent application no. 10 2021 125 349.7, filed Sep. 30, 2021, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for operating a motor vehicle including a first electric machine and a second electric machine, which are electrically interconnected to each other, the method comprising:
    operating the first electric machine at a first operating point and the second electric machine at a second operating point, and
    at least partly compensating reactive power that is generated by the first electric machine operating at the first operating point and that flows to the second electric machine by operating the second electric machine at the second operating point,
    wherein an alternating current side of the first electric machine and an alternating current side of the second electric machine are connected or can be connected via a switching device, wherein the alternating current side of the second electric machine at the second operating point is connected via the switching device to the alternating current side of the first electric machine.

2. The method according to claim 1, wherein the first electric machine and the second electric machine are each an electric traction motor of the motor vehicle, wherein the electric traction motors are each associated with a different axle of the motor vehicle.

3. The method according to claim 1, wherein the second operating point is set depending on the first operating point, and/or depending on driving state information describing a driving state of the motor vehicle.

4. The method according to claim 1, wherein the second operating point is set depending on the reactive power generated or taken up at the first operating point.

5. The method according to claim 1, wherein the second operating point is set depending on a measured value describing a reactive current and/or a reactive power of the first electric machine at the first operating point and/or the second operating point is set depending on a memorized assignment rule.

6. The method according to claim 1, wherein the first electric machine is operated in a motor mode at the first operating point and/or the second electric machine is operated in a phase shifter mode at the second operating point.

7. The method according to claim 1, wherein the second electric machine at the second operating point is mechanically decoupled via at least one coupling device from a component of a drive train of the motor vehicle.

8. The method according to claim 7, wherein the second electric machine at the second operating point is mechanically decoupled via at least one coupling device from transmission or an axle of a drive train of the motor vehicle.

9. The method according to claim 1, wherein the first electric machine and the second electric machine are each connected or can be connected across at least one inverter to a direct current sub-grid of the motor vehicle, wherein the first electric machine at the first operating point and the second electric machine at the second operating point are each operated via a different one of the inverters.

10. The method according to claim 1, wherein the first electric machine and/or the second electric machine is an asynchronous motor or a synchronous motor.

11. The method according to claim 1, wherein the first electric machine and/or the second electric machine is a permanently excited synchronous motor or an externally excited synchronous motor.

12. A motor vehicle comprising:
a first electric machine;
a second electric machine, and
a switching device that, in operation, connects an alternating current side of the first electric machine and an alternating current side of the second electric machine, wherein the first electric machine and the second electric machine are electrically interconnected to each other; and
a control device that, in operation:
operates the first electric machine at a first operating point and the second electric machine at a second operating point, and at least partly compensates reactive power that is generated by the first electric machine operating at the first operating point and that flows to the second electric machine by operating the second electric machine at the second operating point, and
controls the switching device to connect the alternating current side of the second electric machine at the second operating point to the alternating current side of the first electric machine.

* * * * *